United States Patent
Shao

(10) Patent No.: US 10,417,160 B2
(45) Date of Patent: *Sep. 17, 2019

(54) SYSTEM AND METHOD FOR EXTENDED PERIPHERAL COMPONENT INTERCONNECT EXPRESS FABRICS

(71) Applicant: Futurewei Technologies, Inc., Plano, TX (US)

(72) Inventor: Wesley Shao, Cupertino, CA (US)

(73) Assignee: FutureWei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,199

(22) Filed: Jun. 15, 2018

(65) Prior Publication Data

US 2018/0300276 A1 Oct. 18, 2018

Related U.S. Application Data

(63) Continuation of application No. 14/822,685, filed on Aug. 10, 2015, now Pat. No. 10,210,124, which is a (Continued)

(51) Int. Cl.
*G06F 13/40* (2006.01)
*G06F 13/42* (2006.01)
*G06F 13/16* (2006.01)

(52) U.S. Cl.
CPC ...... *G06F 13/4027* (2013.01); *G06F 13/1684* (2013.01); *G06F 13/4022* (2013.01); (Continued)

(58) Field of Classification Search
CPC ............. G06F 13/4022; G06F 13/4027; G06F 13/1684; G06F 13/4045; G06F 13/4221
See application file for complete search history.

(56) References Cited

U.S. PATENT DOCUMENTS 9,135,200 B2    9/2015   Shao
2007/0147359 A1 6/2007   Congdon et al.
(Continued)

FOREIGN PATENT DOCUMENTS

CN    101052013 A    10/2007
CN    101165665 A    4/2008
(Continued)

OTHER PUBLICATIONS

Charlie Demerjian, Intel shows off Rack Scale Architecture and Rack Disaggregation plans. Apr. 9, 2013, SemiAccurate on Target Technology News, 8 pages.
(Continued)

*Primary Examiner* — Nimesh G Patel
(74) *Attorney, Agent, or Firm* — FutureWei Technologies, Inc.

(57) ABSTRACT

An exemplary embodiment extended peripheral component interconnect express (PCIe) device includes a host PCIe fabric comprising a host root complex. The host PCIe fabric has a first set of bus numbers and a first memory mapped input/output (MMIO) space on a host CPU. An extended PCIe fabric includes a root complex endpoint (RCEP) as part of an endpoint of the host PCIe fabric. The extended PCIe fabric has a second set of bus numbers and a second MMIO space separate from the first set of bus numbers and the first MMIO space, respectively.

15 Claims, 5 Drawing Sheets

Related U.S. Application Data continuation of application No. 13/931,640, filed on Jun. 28, 2013, now Pat. No. 9,135,200.

(52) U.S. Cl.
CPC ...... *G06F 13/4045* (2013.01); *G06F 13/4221* (2013.01); *G06F 2213/0026* (2013.01)

(56) References Cited

U.S. PATENT DOCUMENTS

| | | |
|---|---|---|
| 2008/0092148 A1 | 4/2008 | Moertl et al. |
| 2008/0147959 A1 | 6/2008 | Freimuth et al. |
| 2008/0209099 A1 | 8/2008 | Kloeppner et al. |
| 2009/0063894 A1 | 3/2009 | Billau et al. |
| 2009/0276551 A1 | 11/2009 | Brown et al. |
| 2010/0146222 A1 | 6/2010 | Cox et al. |
| 2010/0165874 A1 | 7/2010 | Brown et al. |
| 2011/0016235 A1 | 1/2011 | Brinkmann et al. |
| 2011/0131362 A1* | 6/2011 | Klinglesmith ...... H04L 12/6418 710/313 |
| 2011/0225341 A1 | 9/2011 | Satoh et al. |
| 2011/0225389 A1 | 9/2011 | Grisenthwaite |
| 2012/0030387 A1 | 2/2012 | Harriman |
| 2012/0166690 A1 | 6/2012 | Regula |
| 2013/0054867 A1 | 2/2013 | Nishita |
| 2014/0075079 A1 | 3/2014 | Tsai |
| 2014/0115223 A1 | 4/2014 | Guddeti et al. |
| 2014/0372741 A1* | 12/2014 | Gardiner ............. G06F 13/4045 713/2 |
| 2016/0137617 A1 | 5/2016 | Sanfilippo et al. |

FOREIGN PATENT DOCUMENTS

| | | |
|---|---|---|
| JP | 2007087083 A | 4/2007 |
| JP | 2008181389 A | 8/2008 |
| JP | 2010520541 A | 6/2010 |
| JP | 2011199419 A | 10/2011 |
| JP | 2011227539 A | 11/2011 |
| JP | 2012128717 A | 7/2012 |
| JP | 2013045236 A | 3/2013 |
| JP | 2013088879 A | 5/2013 |
| JP | 2013196593 A | 9/2013 |
| JP | 2016522236 A | 7/2016 |
| KR | 20090117885 A | 11/2009 |
| KR | 20100080360 A | 7/2010 |

OTHER PUBLICATIONS

Ryuji Naito, Thorough Explantation If You Make it, You Will Understand PCI Express, Interface vol. 36 No. 7, Japan, CQ Publishing Co., Ltd., Jul. 1, 2010, 20 pages.

Shao, Wesley. Extending PCI Express Fabrics. PCI-SIG Developers Conference Asia-Pacific Tour 2013. Oct. 22, 2013, 22 pages.

Jack Regula, Using Non-transparent Bridging in PCI Express Systems. Jun. 1, 2004, PLX Technology, Inc., 31 pages.

\* cited by examiner

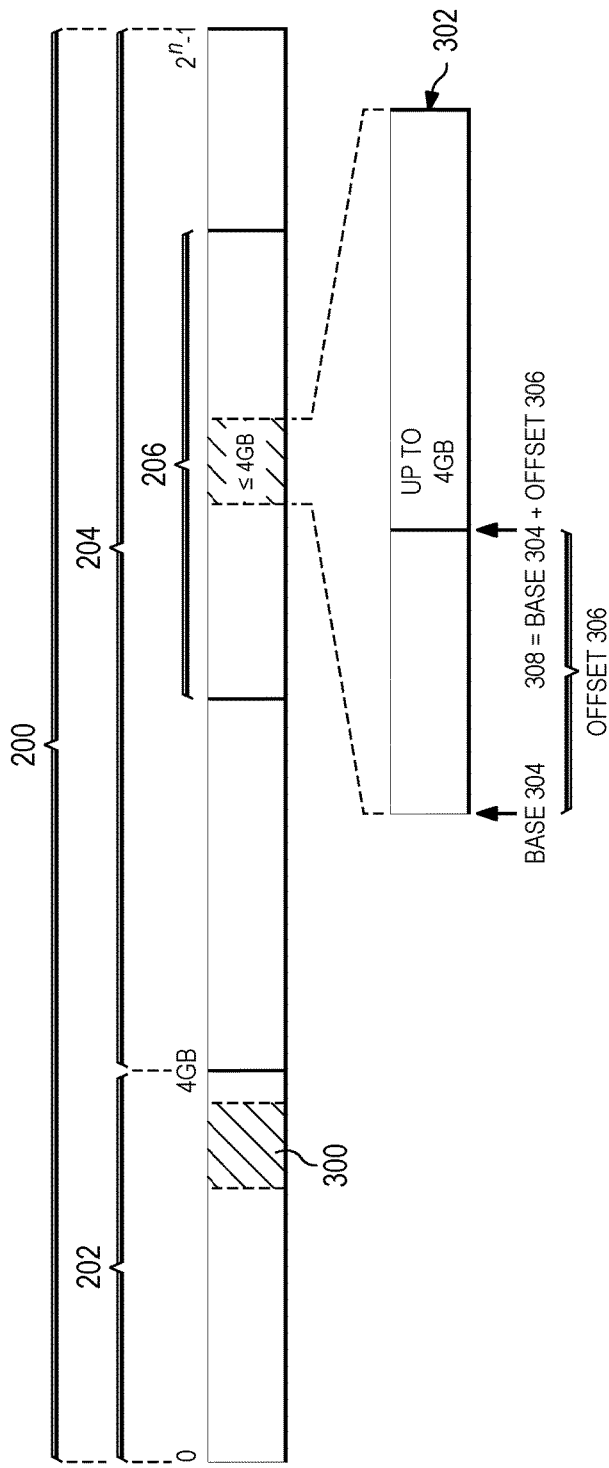
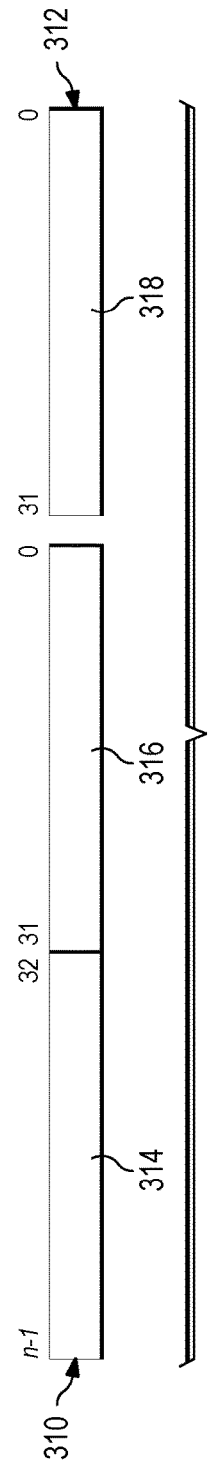
FIG. 3A
FIG. 3B

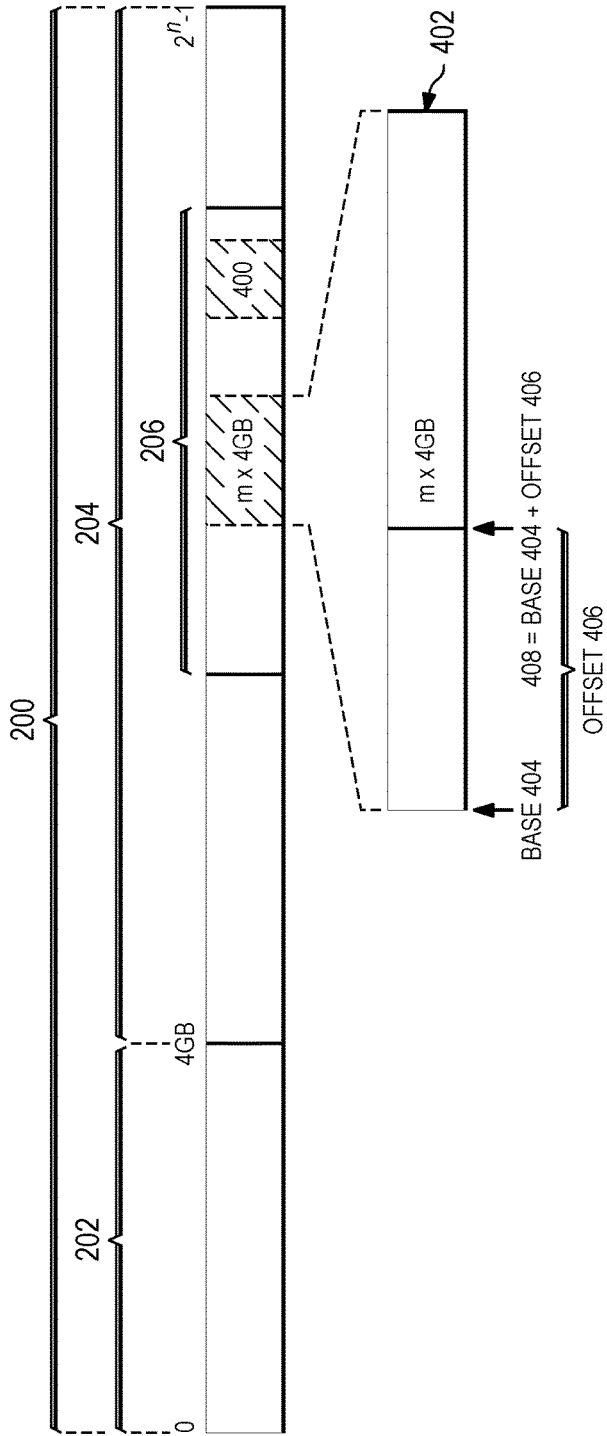
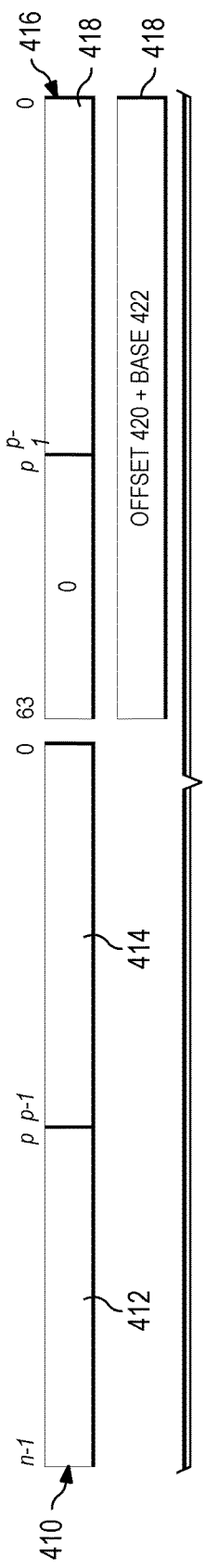
FIG. 4A
FIG. 4B

SYSTEM AND METHOD FOR EXTENDED PERIPHERAL COMPONENT INTERCONNECT EXPRESS FABRICS

PRIORITY CLAIM AND CROSS-REFERENCE

This application is a continuation of U.S. patent application Ser. No. 14/822,685, filed on Aug. 10, 2015, which is a continuation of U.S. patent application Ser. No. 13/931,640, filed Jun. 28, 2013, entitled "System and Method for Extended Peripheral Component Interconnect Express Fabrics". All of the aforementioned patent applications are hereby incorporated by reference in their entireties.

TECHNICAL FIELD

The present invention relates generally to the computing industry; and, more specifically to systems, methods, computer program products, and apparatuses for extending peripheral component interconnect express (PCIe) fabrics.

BACKGROUND

Peripheral component interconnect express (PCIe) is a high-speed serial computer expansion bus standard widely used to attach various hardware devices (e.g., storage devices, network cards, sound cards, and the like) to a host central processing unit (CPU). Because the host CPU memory configurations may be vendor-specific, PCIe provides for an input/output (I/O) standard to connect various devices to the CPU. PCIe allows for a variety of improvements over older bus standards (e.g., PCI and PCI-eXtended). For example, PCIe generally allows for higher maximum system bus throughput, lower I/O pin count, smaller bus footprint, native hot-plug functionality, and other advantages.

An issue with the PCIe bus standard is that each PCIe fabric is limited by a finite amount of resources. For example, each PCIe fabric's 32-bit address memory space may not exceed 4 GB in size, and each fabric may only have a maximum of 256 bus numbers. Because PCIe operates on point-to-point serial connections, these limitations directly cap the maximum number of nodes (i.e., devices) that may be attached to a PCIe fabric. That is, bus numbers for various devices may not overlap, and each attached device requires a set of unique bus numbers to function. Various bus numbers in a PCIe fabric may be reserved for particular uses (e.g., as internal bus numbers of PCIe switches, hot-plug functionality, or the like), further limiting the number of available bus numbers.

Furthermore, a fault occurring at any component attached to a PCIe fabric may impact any other downstream or upstream components attached to the faulty component. As the number of components and software drivers attached to the PCIe fabric increases, fault handling becomes more difficult and the propagation of any faults may lead to a system-wide crash.

SUMMARY OF THE INVENTION

These and other problems are generally solved or circumvented, and technical advantages are generally achieved, by preferred embodiments of the present invention, which provide an extended peripheral component interconnect express fabric.

In accordance with one example embodiment, a peripheral component interconnect express topology includes a host PCIe fabric comprising a host root complex. The host PCIe fabric includes a first set of bus numbers and a first memory mapped input/output (MMIO) space on a host central processing unit (CPU). Further, an extended PCIe fabric is provided, which includes a root complex endpoint (RCEP) as part of an endpoint of the host PCIe fabric. The extended PCIe fabric also includes a second set of bus numbers and a second MMIO space separate from the first set of bus numbers and the first MMIO space, respectively.

In accordance with another example embodiment, a peripheral component interconnect express (PCIe) topology includes an extended PCIe fabric. The extended PCIe fabric includes a root complex end point (RCEP). The RCEP is configured to be part of an endpoint of a first level PCIe fabric. In addition, the extended PCIe fabric comprises a memory mapped input/output (MMIO) space and a set of bus numbers.

In accordance with yet another example embodiment, a method for connecting peripheral includes providing a root complex endpoint (RCEP) hosting an extended peripheral component interconnect express (PCIe) fabric as part of an endpoint of a host PCIe fabric. The extended PCIe fabric has a first MMIO space that is separate from a second MMIO space of the host PCIe fabric. The method further comprises mapping the first MMIO space to the second MMIO space.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A and 3B are block diagrams of 32-bit memory space mapping and addressing for an extended fabric in accordance with various example embodiments;

FIGS. 4A and 4B are block diagrams of 64-bit memory space mapping and addressing for an extended fabric in accordance with various example embodiments.

DETAILED DESCRIPTION OF ILLUSTRATIVE EMBODIMENTS

Example embodiments covering various aspects of the encompassed innovation are discussed in greater detail below. It should be appreciated, however, that the present invention provides many applicable unique and novel concepts that can be embodied in a wide variety of specific contexts. Accordingly, the specific embodiments discussed herein are merely illustrative of specific ways to make, use, and implement various aspects of the present invention, and do not necessarily limit the scope thereof unless otherwise claimed.

The following various exemplary embodiments are described in a specific context, namely a peripheral component interconnect express (PCIe) bus standard fabric. As will be appreciated, however, such example embodiments may also extend other fabrics (e.g., upside down tree topologies with resource restrictions).

Figure 5:
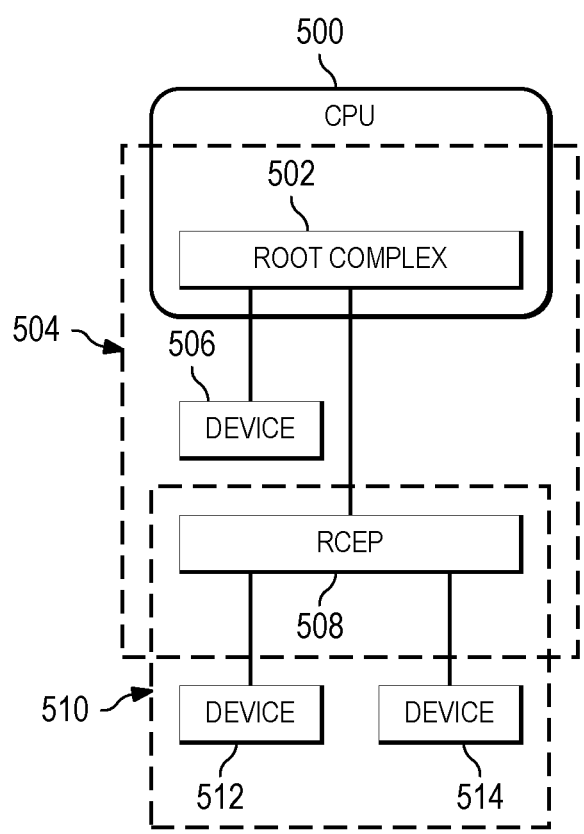
FIG. 5 is a system diagram of a computing system having PCIe fabrics in accordance with various example embodiments.

As described herein, a root complex is a hardware structure serving as a bridge between a PCIe fabric and a host central processing unit (CPU). The root complex may be integrated as part of the CPU. For example, FIG. 5 illustrates a root complex 502 as part of CPU 500. The root complex manages and forwards various requests between the CPU and devices (e.g., devices 506 and 508) connected to the same PCIe fabric (e.g., PCIe fabric 504). The root complex also maps various connected devices (including device storage locations such as registers and memory locations) onto PCIe memory space. These types of mapping and memory space are known as memory mapped input/output (MMIO) space.

Also as used herein, MMIO space may include a portion of memory addressable using 32-bit addresses, which is generally limited to the first 4 GB of MMIO space. The MMIO space may further include a portion of memory addressable using 64-bit addresses, which may be mapped to MMIO space above the first 4 GB. Various example embodiments described herein include one or more additional root complex hardware structures as part of the endpoints of the host PCIe fabric. By adding root complex functionalities to endpoints (referred to as a root complex endpoint (RCEP)), additional PCIe fabrics may be connected to form extended PCIe fabrics that are not limited to the finite resources of the host PCIe.

For example, FIG. 5 illustrates a RCEP 508 and an extended PCIe fabric 510 connecting additional endpoints (e.g., device 512 and 514) to host CPU 500. In accordance with various exemplary embodiments, these RCEPs may be used to isolate faults from contaminating bordering fabrics or devices. Furthermore, other example embodiments provide that the RCEPs and extended PCIe fabrics can be compatible with existing peripheral device drivers; thus, eliminating any need for software updates to existing device drivers.

Figure 1:
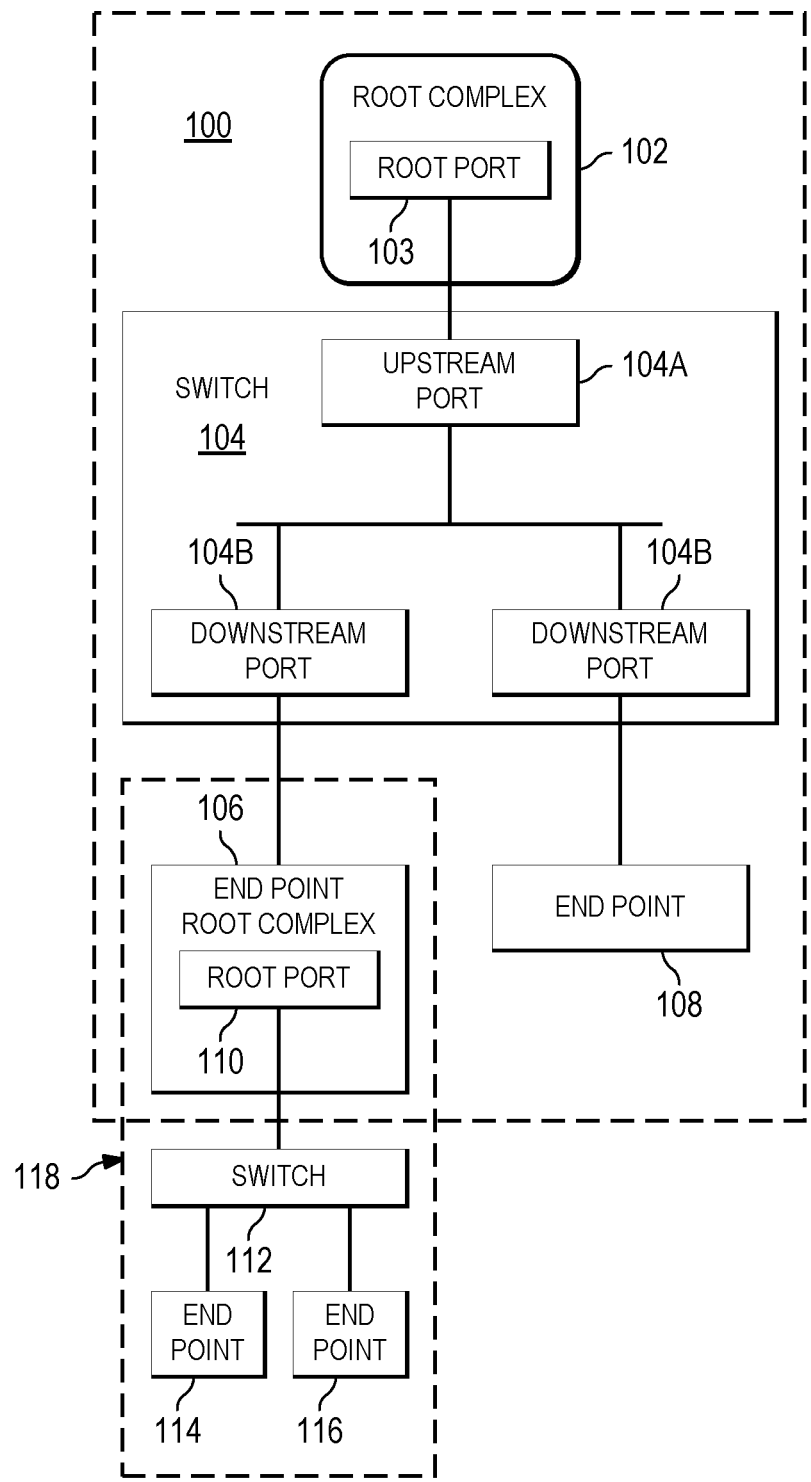
FIG. 1 is a block diagram of a peripheral component interconnect express (PCIe) fabric in accordance with various example embodiments.

FIG. 1 illustrates a block diagram of a first level PCIe fabric 100 connected to an extended PCIe fabric 118 in accordance with various exemplary embodiments. The PCIe fabric 100 may include a host root complex 102 that manages and forwards various requests between the host CPU and various devices connected to PCIe fabric 100. Generally, root complex 102 owns a set of 256 unique bus numbers and MMIO space, and it maps various connected devices (including their associated registers and/or memory hardware) to its MMIO space. Further, root complex 102 may include a root port 103, which is a hardware bridge structure allowing for PCI-to-PCI connections between the host CPU and the devices connected to PCIe fabric 100 (e.g., endpoints 106 and 108). Although FIG. 1 illustrates root complex 102 as having only one root port 103, a typical root complex 102 may have multiple root ports 103 (e.g., between four to six root ports).

As shown in FIG. 1, root complex 102 is electrically connected to endpoints 106 and 108 through root port 103 and a switch 104. Typically, endpoints 106 and 108 are structures that terminate PCIe fabric 100. Such endpoints 106 and 108 may include storage devices, networking devices, sound cards, video cards, and the like. Also illustrated in FIG. 1 is switch 104, which may include at least one upstream port (port 104A) and numerous downstream ports (e.g., ports 104B) interconnecting various endpoints (e.g., 106 and 108) to root complex 102. As generally used herein, an upstream port refers to a port that points towards the host root complex (e.g., root complex 102), while a downstream port refers to a port that points away from it.

Switch 104 may include internal buses that allow multiple devices to be connected to a single root port 103 while still maintaining a point-to-point serial connection used by the PCIe standard. Although FIG. 1 only illustrates one switch 104 connecting two endpoints 106 and 108 to root port 103, various exemplary embodiments contemplate multiple root ports connected to any number of switches, wherein each switch may be connected to any varying number of endpoints. Alternatively, or in conjunction, a root port 103 may be connected directly to an endpoint. Accordingly, the configuration illustrated in FIG. 1 and other figures herein is for illustrative purposes only and is not meant to limit or otherwise narrow the scope of the present invention unless otherwise explicitly claimed.

As shown in FIG. 1, endpoint 106 may be a root complex endpoint (RCEP) in accordance with exemplary embodiments, which provides a hardware bridge between extended PCIe fabric 118 and first level PCIe fabric 100. That is, RCEP 106 may host extended PCIe fabric 118. In accordance with such embodiments, RCEP 106 may be similar in build and logic to a host root complex (e.g., root complex 102). As such, RCEP 106 may include its own set of bus numbers, PCIe configuration space, and MMIO space—separate from those of root complex 102. Therefore, additional devices may be connected to RCEP 106 even when root complex 102 does not have a sufficient amount of available resources (e.g., bus numbers).

For example, endpoints 114 and 116 may be electrically connected to RCEP 106 through switch 112 and root port 110. As noted above, endpoints 114 and 116 may be most any type of peripheral devices, including storage devices, networking devices, sound cards, video cards, and the like. Similar to previous PCIe fabrics, endpoints 114 and 116 may simply terminate extended PCIe fabric 118. Alternatively, and in accordance with exemplary embodiments, endpoints 114 and/or 116 may include another RCEP having its own set of bus numbers and MMIO space; thus, forming another extended PCIe fabric. Accordingly, RCEPs essentially add gateway functionality to a PCIe endpoint; and therefore, theoretically, allow for a virtually limitless number of nodes to be attached to a host root complex.

Although FIG. 1 shows extended PCIe fabric 118 as having only one root point 110, one switch 112, and two endpoints 114 and 116, various embodiments may include an extended PCIe fabric having multiple root ports, multiple switches per extended fabric, and multiple endpoints per switch.

In accordance with exemplary embodiments, RCEP 106's MMIO may include a portion addressable using 32-bit addresses (referred to as 32-bit memory space) and a portion using 64-bit addresses (referred to as 64-bit memory space). In accordance with such embodiments, RCEP 106's PCIe configuration space, 32-bit memory space, and 64-bit memory space may be mapped to the 64-bit MMIO space of host PCIe fabric 100 (i.e., the portion of PCIe fabric 100's MMIO space that is addressable using 64-bit addresses). Thus, in accordance with such embodiments, RCEP 106 may be accessed from the MMIO space of host PCIe fabric 100. The mapping and enumeration of RCEP 106's extended fabric may be done using endpoint drivers associated with RCEP 106, as explained in greater detail below.

In accordance with other exemplary embodiments, RCEP 106 may also include fault handling mechanisms that resolve any faults occurring in its downstream devices (e.g., endpoints 114 and 116). Therefore, in such embodiments, faults may be contained by RCEP 106 and not propagate upstream to PCIe fabric 100, and RCEP 106 may act as a fault boundary. Further, RCEP 106 may generate an error interrupt to notify host root complex 102 of any faults. In such embodiments, these error interrupts may be used as a reporting mechanism, and any PCIe faults occurring in RCEP 106's downstream devices may be handled by RCEP 106 and not passed upstream to host root complex 102. The specific details regarding error interrupt reporting and fault handling may be implementation specific and vary between computing platforms/root complexes. For example, current PCIe standards leave the implementation details regarding how a root complex handles faults open to different varying vendor-specific implementations of computing platforms/ root complexes. Therefore, the implementation details of RCEP 106's fault handling and error reporting mechanisms may, similarly, be open to different implementations depending on the applicable computing platform/root complex configurations.

Figure 2A:
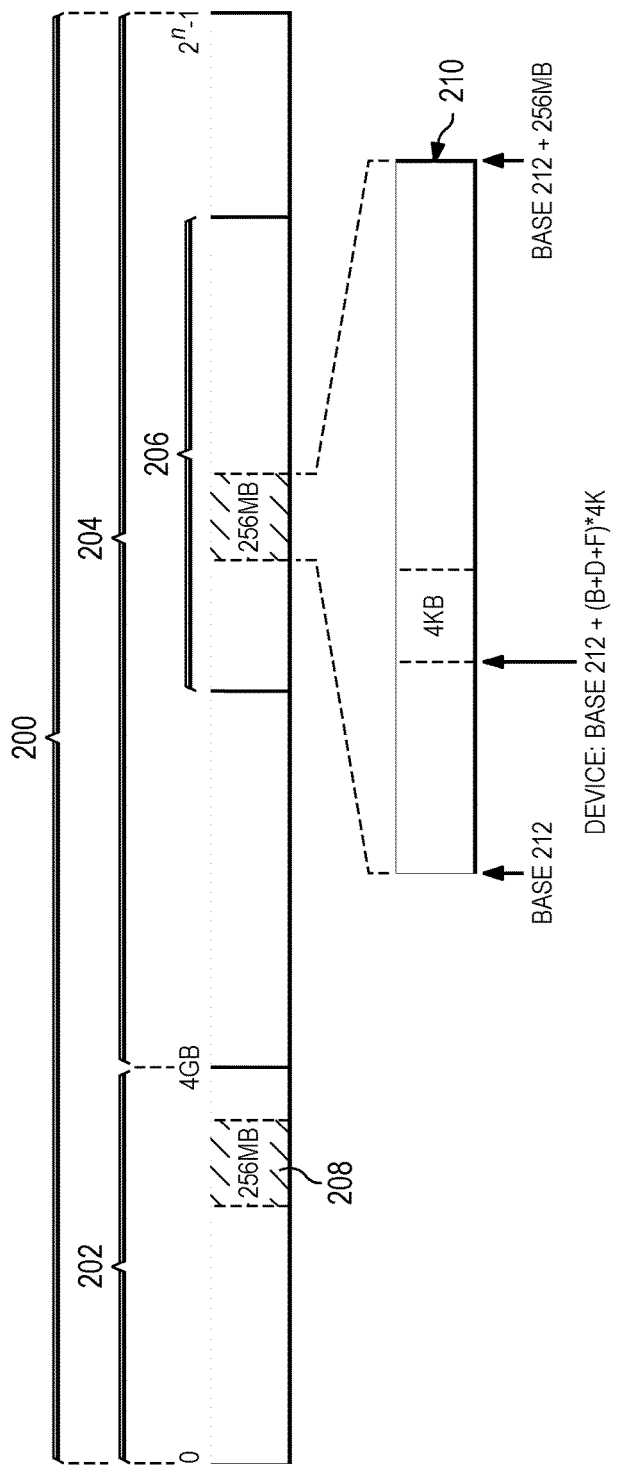
FIGS. 2A and 2B are block diagrams of PCIe configuration space mapping and addressing for an extended fabric in accordance with various example embodiments.
Figure 2B:
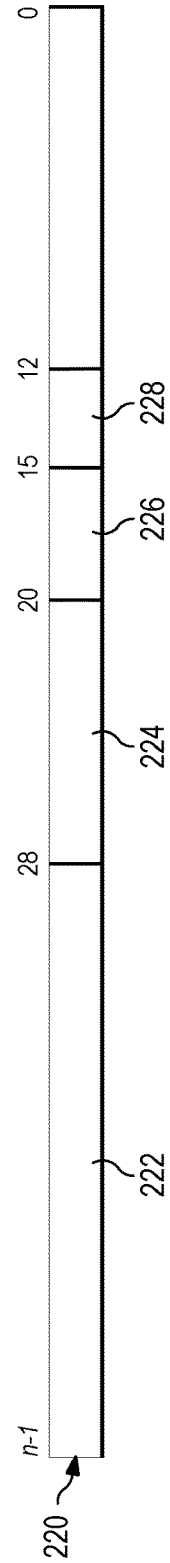

Mapping and accessing PCIe configuration space for extended fabric 118 may be done using any suitable configuration. For example, FIGS. 2A and 2B illustrate an example of PCIe configuration space mapping and access in accordance with exemplary embodiments, which support using MMIO to access PCI configuration space. Generally, physical address space 200 is the physical address space of the host CPU, which may be, e.g., $2^n-1$ bytes in size (where "n" is the number of physical address bits implemented by the host CPU). As shown, physical address space 200 may include a portion of space 202 addressable via 32-bit physical addresses with a remaining portion 204 addressable via 64-bit physical addresses. In such embodiments, portion 202 may occupy the first 4 GB of address space 200, while portion 204 may occupy the remainder of address space 200. Moreover, portion 204 may further include a portion allocated to 64-bit MMIO space 206 of the host, first-level PCIe fabric (e.g., PCIe fabric 100). Of course, other memory allocations, configurations and mappings of the MIMO space to PCIe fabric are contemplated herein; and thus, any specific implementation described herein is used for illustrative purposes only—unless otherwise explicitly claimed.

In accordance with exemplary embodiments, all (or any portion) of a device's functions connected to PCIe fabric 100 or extended fabric 118 may be mapped to their respective fabrics' own dedicated 256 MB of configuration space. Such space may be addressable, for example, by knowing the 8-bit PCI bus, 5-bit device, and 3-bit function numbers for a particular device function. This type of function addressing may be referred to herein as bus/device/function (BDF) addressing, which allows for a total of 256 bus numbers, 32 devices, and 8 functions for each PCIe fabric. Generally, in such embodiments, the device number may be set to 0 in accordance with PCIe bus standard fabrics due to PCIe's serial point-to-point connection structure. Further, in accordance with such embodiments, each device function may be entitled to 4 KB of configurations registers.

As shown, PCIe configuration space for the first level PCIe fabric (e.g., fabric 100) may occupy 256 MB of address space 208 in portion of space 202. In such embodiments, PCIe configuration space for the extended PCIe (e.g., extended fabric 118) may be mapped to 256 MB of address space 210 in 64-bit MMIO space 206. Further, any MMIO transactions in address spaces 208 or 210 may be treated as PCIe configuration access transactions for either PCIe host fabric 100 or extended fabric 118, respectively, by their corresponding root complex.

In such embodiments, the addresses of extended PCIe configuration space 210 may start at base value 212. Thus, the configuration space registers of a PCIe device function located at bus number B, device number D, and function number F may start at, for example, Base+(B+D+F)*4K. Alternatively, other suitable configurations for addressing device space registers are also contemplated, and the description of BDF addressing here is used for illustrative purposes only.

FIG. 2B illustrates an example PCIe device physical address format 220 in accordance with example embodiments. Format 220 may include a base field 222 (located, e.g., between bits n−1 and 28), a bus field 224 (located, e.g., between bits 27 and 20), a device field 226 (located, e.g., between bits 19 and 15), and a function field 228 (located e.g., between bits 14 and 12). Moreover, in such embodiments, bits 11 to 0 may contain an offset of the configuration space register (e.g., within the device) being accessed, which may be included, e.g., for memory alignment purposes.

Mapping and accessing 32-bit memory space for extended PCIe fabric 118 may be done using any suitable configuration. For example, FIGS. 3A and 3B illustrate an example of PCIe 32-bit memory space mapping and access in accordance with exemplary embodiments. Generally, 32-bit memory space access may be used for device register banks that may be accessed with 32-bit addresses. In such embodiments, corresponding transactions may be marked as 32-bit PCIe memory space access, e.g., in a PCIe packet header. Of course, other memory allocations, configurations and mappings of the MIMO space to PCIe fabric are contemplated herein; and thus, any specific implementation described herein is used for illustrative purposes only—unless otherwise explicitly claimed.

Under current PCIe standards, the maximize size for a 32-bit address space is 4 GB. Furthermore, in accordance with current PCIe standards, on certain computing platforms (e.g., x86 platforms) the 32-bit memory for first-level PCIe fabric 100 may be shared with its PCIe configuration space and, thus, may be only 256 MB in size.

In accordance with exemplary embodiments, extended PCIe fabric 118 may have its own 32-bit memory space separate from the physical address space 200 of the host CPU. Moreover, as shown in FIG. 3A, RCEP 106 may map extended fabric 118's 32-bit address space to a higher 64-bit address window on the host's 64-bit MMIO space 206 as illustrated by memory space 302. In such embodiments, memory space 302 may be separate from the 32-bit memory space 300 for the first level fabric (e.g., PCIe fabric 100). Further, memory space 300 may be located at the host CPU's 32-bit addressable space 202, which may be within the same low 4G space as PCIe configuration space 208. As shown, memory space 302 starts at a base address 304 and may be up to 4 GB in size. Thus, in accordance with such embodiments, a device register bank (e.g., register bank 308) may be addressed by knowing the appropriate offset (e.g., offset 306) of the register bank. That is, the address of register bank 308 may base 304+offset 306. Alternatively, other suitable schemes for addressing register bank 308 are also contemplated.

FIG. 3B illustrates register bank physical address formats 310 and 312 for host address space and extended fabric address space, respectively in accordance with example embodiments. Format 310 may include a base field 314 (e.g., occupying bits n−1 to 32) and an offset field 316 (e.g., occupying bits 31 to 0). In such embodiments, format 310 may be used to address a device register bank mapped to MMIO space 206. Format 312 may only contain an offset field 318 (e.g., occupying 32 bits) for addressing the device register bank on the extended fabric (e.g., fabric 118). Moreover, before placing a PCIe packet on extended fabric

118, RCEP 106 may strip the upper 32-bits format 310 (which may be 64-bits long) and mark the stripped PCIe packet as a 32-bit address packet.

Mapping and accessing 64-bit memory space for extended PCIe fabric 118 may be done using any suitable configuration. For example, FIGS. 4A and 4B illustrate an example of 64-bit memory space mapping and access in accordance with exemplary embodiments. Generally, 64-bit memory space access may be used for device register banks that can be accessed with 64-bit addresses or 32-bit addresses. Note, that if a 32-bit address range is assigned to a 64-bit address, the PCIe hardware may use a 32-bit PCI memory space configuration scheme to access (e.g., the configuration described in FIGS. 3A and 3B). In such embodiments, corresponding transactions may be marked as 64-bit PCIe memory space access in a PCIe packet header. Moreover, for historical reasons, the 64-bit memory space may generally be located above the lower 4 GB of physical address space. Of course, other memory allocations, configurations and mappings of the MIMO space to PCIe fabric are contemplated herein; and thus, any specific implementation described herein is used for illustrative purposes only—unless otherwise explicitly claimed.

In such embodiments, extended PCie fabric 118 may have its own 64-bit memory space separate from the physical address space 200 of the host CPU. As shown in FIG. 4A, RCEP 106 may map extended fabric 118's 64-bit address space to the host CPU's 64-bit MMIO space 206 as illustrated by memory space 402. Further, memory space 402 may be separate from a 64-bit PCIe memory space 400 of the first level fabric 100, which may also be located in 64-bit MMIO space 206. In such embodiments, Memory space 402 may start at a base address 404 and may be, for example, m times 4 GB in size (where m is a constant, signifying that space 402 may have a size of one or more times 4 GB). Furthermore, a device register bank (e.g., register bank 408) may be addressed by knowing an appropriate offset (e.g., offset 406) of the register bank. Thus, in accordance with such embodiments, an address of register bank 408 may be base 404 plus offset 406. Alternatively, other suitable schemes for addressing register bank 408 are also contemplated.

FIG. 4B illustrates register bank physical address formats 410 and 416/418 for host CPU address space and extended fabric address space, respectively in accordance with example embodiments. Format 410 may include a base field 412 (e.g., occupying bits n−1 to p) and an offset field 414 (e.g., occupying bits p−1 to 0). The value of constant p may be 32+ln(m), which may be rounded to the next highest integer value. Format 410 may be used to address a device register bank mapped to 64-bit MMIO space 206.

In certain exemplary embodiments, addressing the device register bank on the extended fabric 118 may be done using format 416. For example, format 416 may be used if the base physical address is size aligned to extended fabric 118's memory space configuration. Using format 416, RCEP 106 may strip the upper bits (e.g., bits 63 to p) of format 410 to form a 64-bit address for extended fabric 118. In other exemplary embodiments, format 418 may be used if the base physical address is not size aligned to extended fabric 118's memory space. In such embodiments, in order to compensate for the non-alignment of the physical address, an offset 420 may be added to a 64-bit system base address 422. Moreover, if the base address is at least 4 GB aligned (e.g., the lower 32-bits are 0) the size adjustment may only be performed for the high 32-bits of the base address.

In an exemplary embodiment, extended fabric 118's PCIe configuration space 210, 32-bit memory space 302, and 64-bit memory space 402 may overlap in the host CPU. In such embodiments, RCEP 106 may request a common mapping window large enough to accommodate all desired address ranges (e.g., spaces 210, 302, and 402) from the host CPU, and RCEP 106 may then divide the common mapping window as necessary into various desired address ranges.

In accordance with exemplary embodiments, extended fabric 118 may support device interrupts, which may be handled using any suitable method. For example, extended fabric 118 may use a message signaled interrupt (MSI) configuration. In such embodiments, MSIs originating from devices connected to extended fabric 118 (e.g., endpoints 114 and 116) may be delivered to applicable root ports (e.g., root port 110) in accordance with the PCIe bus standard. Furthermore, root port 110 of RCEP 106 may have a pre-assigned address window for MSIs. In such embodiments, when a memory write address matches the pre-assigned MSI address window, the transaction may be recognized as an interrupt. Moreover, Root port 110 may collect all the MSIs originating from its downstream fabrics and deposit them into a queue (where the queue may be located in the host CPU's memory in physical address space 200). Root port 110 may then signal a separate interrupt, which may also be a MSI, to its upstream root port (e.g., host root port 103). Host root port 102 may then trigger an appropriate software handler in accordance with the received interrupt. An interrupt handler of RCEP 106's root port 110 may then examine the MSI queue in main memory, determine the originating device (e.g., endpoint 114 or 116), and dispatch the appropriate interrupt handler of the device driver. Of course, other schemes for handing device interrupts are contemplated herein; and thus, any specific implementation described herein is used for illustrative purposes only—unless otherwise explicitly claimed.

In accordance with other exemplary embodiments, extended fabric 118 may also support direct memory access (DMA), which may be handled using any suitable method. In such embodiments, DMA transactions may include read requests, read completions, and write requests. PCIe packets may carry a system physical address or an IO (input/output) virtual address translated by an IOMMU (input/output memory management unit). Moreover, the PCIe requester IDs may be per fabric. Thus, the requester IDs may be replaced with RCEP 106's ID when a request crosses a PCIe fabric boundary and goes upstream to host PCIe fabric 100. That is, on extended fabric 118, the requester ID may be the ID of the endpoint device (e.g., endpoint 114 or 116). As the request gets forwarded upstream to root complex 102, the requester ID may be replaced with the ID of RCEP 106.

In such embodiments, DMA writes refer to moving data from a device (e.g., endpoint 114 or 116) to the host CPU's memory. RCEP 106 may replace the device ID with RCEP 106's ID when the request is passed upstream by RCEP 106 to root complex 102 and the host CPU. Furthermore, DMA reads refer to moving data from the host CPU's memory to the device. In such embodiments, RCEP 106 may utilize a hardware scoreboard to track all read requests by assigning transaction tags (e.g., as part of the request packets) for transactions to fabric 100. These transaction tags may be linked to RCEP 106's score board entries and may be used to record the requester IDs of read request packets originating on extended fabric 118. Completion data received by RCEP 106 from root complex 102 may carry the same transaction tag as the corresponding read request in accordance with such embodiments. Thus, in such embodiments, transaction tags may be used to match against score board entries to determine the appropriate device ID used on extended fabric 118. Of course, other schemes for handing DMA requests are contemplated herein; and thus, any specific implementation described herein is used for illustrative purposes only—unless otherwise explicitly claimed.

Therefore, using the various PCIe configuration access, memory access, DMAs, and interrupt mechanisms described in exemplary embodiments of the above paragraphs, RCEP devices may be used to host extended PCIe fabrics and connect additional devices (e.g., additional RCEP devices and/or peripheral devices) to a host root complex. RCEP devices may be similar to a typical PCIe root complex logic. Each extended PCIe fabric may have its own MMIO space and set of bus numbers. Therefore, the total number of devices that may be connected to a host CPU may not limited to the number of available bus numbers of the host PCIe fabric. In such embodiments, the MMIO space of each of the extended fabric may mapped to the 64-bit MMIO space of its parent fabric (e.g., the parent fabric for extended fabric 118 is first level fabric 100) for ease of access. Furthermore, fabric enumeration of the extended fabrics may be achieved through the RCEP endpoint device driver. In such embodiments, each RCEP may handle faults originating on the applicable extended root complex fabric. Thus, fault isolation may be achieved so that downstream fabric faults may be intercepted at the fabric boundary of an extended PCIe fabric and not propagated upstream.

In accordance with exemplary embodiments, almost any peripheral device (e.g., sound cards, video cards, network drivers, memory cards, and the like) may be connected to the extended fabric and need not change their driver software. In such embodiments, the extended PCIe fabric is interacts with peripheral devices in the same manner as a first level PCIe fabric. Moreover, the host CPU's software (e.g., an operating system) and RCEP drivers may be modified and/or created to set up register mapping, DMA address mapping, implement interrupt handlers through the RCEP, and other similar functions. Therefore, peripheral devices need not be notified that they are connected to an extended PCIe fabric instead of a first level PCIe fabric. Thus, extended PCIe fabrics and RCEP may be compatible with existing peripheral device drivers.

While this invention has been described with reference to illustrative exemplary embodiments, this description is not intended to be construed in a limiting sense. Various modifications and combinations of the illustrative exemplary embodiments, as well as other embodiments of the invention, will be apparent to persons skilled in the art upon reference to the description. It is therefore intended that the appended claims encompass any such modifications or embodiments.

I claim:

1. A peripheral component interconnect express (PCIe) system comprising:
    a host PCIe fabric comprising a host root complex and configured with a first set of bus numbers; and
    an extended PCIe fabric comprising a root complex endpoint (RCEP), the RCEP being as an endpoint of the host PCIe fabric, wherein the extended PCIe fabric is configured with a second set of bus numbers separate from the first set of bus numbers, wherein the RCEP is configured to connect with one or more endpoints of the extend PCIe fabric using the second set of bus numbers, and wherein the RCEP is configured to handle a fault originating from the extended PCIe fabric and isolate the fault from being propagated to the host PCIe fabric.

2. The PCIe system of claim 1, wherein the host PCIe fabric comprises a first memory mapped input/output (MMIO) space, and wherein the extend PCIe fabric comprises a second MMIO space separate from the first MMIO space.

3. The PCIe system of claim 2, wherein the second MMIO space of the extended PCIe fabric is mapped into the first MMIO space.

4. The PCIe system of claim 3, wherein a 32-bit memory space of the extended PCIe fabric is mapped into a 64-bit MMIO space of the first MMIO space.

5. The PCIe system of claim 3, wherein a 64-bit memory space of the extended PCIe fabric is mapped into a 64-bit MMIO space of the first MMIO space.

6. The PCIe system of claim 2, wherein a PCIe configuration space of the extended PCIe fabric is mapped into the first MMIO space.

7. The PCIe system of claim 6, wherein each device function of the extended PCIe fabric is mapped into a respective four kilobytes of a 64-bit MMIO space of the first MMIO space.

8. The PCIe system of claim 6, wherein the PCIe configuration space of the extended PCIe fabric is mapped into a part of the first MMIO space separate from a PCIe configuration space of the host PCIe fabric.

9. A method for extending peripheral component interconnect express (PCIe) fabric, comprising:
    hosting, by a root complex endpoint (RCEP), an extended peripheral component interconnect express (PCIe) fabric connected to a host PCIe fabric, wherein the extended PCIe fabric is configured with a second set of bus numbers, the host PCIe fabric is configured with a first set of bus numbers, the second set of bus numbers being separate from the first set of bus numbers, wherein the RCEP is an endpoint of the host PCIe fabric, and wherein the RCEP is configured to connect with one or more endpoints of the extend PCIe fabric using the second set of bus numbers;
    handling, by the RCEP, a fault originating from the extended PCIe fabric; and
    isolating, by the RCEP, the fault from being propagated to the host PCIe fabric.

10. The method of claim 9, wherein the extended PCIe fabric includes an additional RCEP hosting an additional extended PCIe fabric and the additional RCEP is as an endpoint of the extended PCIe fabric, wherein the additional extended PCIe fabric comprises:
    a third MMIO space separate from the first MMIO space and the second MMIO space; and
    a third set of bus numbers separate from the first set of bus numbers and the second set of bus numbers.

11. The method of claim 9, further comprising handling, by the RCEP, device interrupts originating from the extended PCIe fabric using message signaled interrupts (MSIs).

12. The method of claim 9, further comprising:
    receiving, by the RCEP, a direct memory access (DMA) request from an endpoint of the extended PCIe fabric;
    replacing, by the RCEP, an originating device ID in the DMA request with a RCEP ID; and
    forwarding, by the RCEP, the DMA request upstream to the host PCIe fabric.

13. The method of the claim 9, wherein the host PCIe fabric is configured with a first memory mapped input/ output (MMIO) space and the extended PCIe fabric is configured with a second MMIO space separate from the first MMIO space.

14. The method of the claim 13, further comprising:
mapping, by the RCEP, the second MMIO space into the first MMIO space.

15. A non-transitory computer-readable medium storing computer instructions, which when executed by one or more processors, perform a method comprising:
hosting, by a root complex endpoint (RCEP) configured as an endpoint of a host PCIe fabric, an extended peripheral component interconnect express (PCIe) fabric with a second set of bus numbers, wherein the host PCIe fabric is configured with a first set of bus numbers, the second set of bus numbers being separate from the first set of bus numbers, and wherein the RCEP is configured to connect with one or more endpoints of the extend PCIe fabric using the second set of bus numbers;
handling, by the RCEP, a fault originating from the extended PCIe fabric; and
isolating, by the RCEP, the fault from being propagated to the host PCIe fabric.

* * * * *